United States Patent
Abbott et al.

(10) Patent No.: US 12,381,747 B2
(45) Date of Patent: Aug. 5, 2025

(54) AUTHENTICATION BASED ON PHYSICALLY UNCLONABLE FUNCTIONS

(71) Applicant: Taiwan Semiconductor Manufacturing Company, Ltd., Hsinchu (TW)

(72) Inventors: Robert Abbott, Hsinchu (TW); Saman M. I. Adham, Hsinchu (TW); Peter Noel, Kanata (CA)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 27 days.

(21) Appl. No.: 18/447,983

(22) Filed: Aug. 10, 2023

(65) Prior Publication Data

US 2023/0396452 A1    Dec. 7, 2023

Related U.S. Application Data

(63) Continuation of application No. 17/360,478, filed on Jun. 28, 2021, now Pat. No. 11,777,747, which is a
(Continued)

(51) Int. Cl.
*H04L 9/32* (2006.01)
*G06F 21/44* (2013.01)
(Continued)

(52) U.S. Cl.
CPC ............ *H04L 9/3278* (2013.01); *G06F 21/44* (2013.01); *H04L 9/0643* (2013.01); *H04L 9/0866* (2013.01); *H04L 9/0869* (2013.01)

(58) Field of Classification Search
CPC ... H04L 9/3278; H04L 9/0869; H04L 9/0866; H04L 9/0643; H04L 2209/12; H04L 2209/34; G06F 21/44
See application file for complete search history.

(56) References Cited

U.S. PATENT DOCUMENTS

| | | |
|---|---|---|
| 8,868,923 B1 | 10/2014 | Hamlet et al. |
| 9,225,512 B1 | 12/2015 | Trimberger |

(Continued)

FOREIGN PATENT DOCUMENTS

| | | | | |
|---|---|---|---|---|
| CN | 109840433 A | * | 6/2019 | ............. G06F 21/44 |
| CN | 114444140 A | * | 5/2022 | ............. G06F 21/44 |

(Continued)

OTHER PUBLICATIONS

Hyunho Kang et al., "The Implementation of Fuzzy Extractor is Not Hard to Do: An Approach Using PUF Data," SCIS 2013, The 30th Symposium on Cryptography and Information Security, Kyoto, Japan, Jan. 22-25, 2013, The Institute of Electronics, Information and Communication Engineers, 7 pgs.

(Continued)

*Primary Examiner* — Sarah Su
(74) *Attorney, Agent, or Firm* — Merchant & Gould P.C.

(57) ABSTRACT

A method and system for authenticating a device is provided. A noisy response is received from a physically unclonable function for a challenge. An error code is generated for correcting the noisy first response. An expected response is generated from the noisy first response and the error code. The expected response and corresponding first helper data is store. The helper data includes the first challenge and the error code. The helper data is provided to a device in response to an authentication request from the device, the first device including the physically unclonable function.

20 Claims, 5 Drawing Sheets

Related U.S. Application Data continuation of application No. 16/195,417, filed on Nov. 19, 2018, now Pat. No. 11,050,574.

(60) Provisional application No. 62/591,982, filed on Nov. 29, 2017.

(51) Int. Cl.
*H04L 9/06* (2006.01)
*H04L 9/08* (2006.01)

(56) References Cited

U.S. PATENT DOCUMENTS

| | | | |
|---|---|---|---|
| 9,584,329 B1 | 2/2017 | Trimberger | |
| 10,491,408 B2* | 11/2019 | Cambou | G06F 21/44 |
| 10,855,478 B2 | 12/2020 | Lu | |
| 11,050,574 B2* | 6/2021 | Abbott | H04L 9/0869 |
| 2009/0083833 A1* | 3/2009 | Ziola | H04L 9/3278 |
| | | | 726/2 |
| 2009/0217045 A1 | 8/2009 | Skoric et al. | |
| 2014/0089685 A1 | 3/2014 | Suzuki | |
| 2014/0100807 A1* | 4/2014 | Rosenblatt | G06F 21/73 |
| | | | 702/82 |
| 2014/0258736 A1* | 9/2014 | Merchan | H04L 9/0866 |
| | | | 713/193 |
| 2014/0331288 A1 | 11/2014 | Yu et al. | |
| 2015/0178143 A1 | 6/2015 | Mathew et al. | |
| 2015/0188717 A1 | 7/2015 | Wu et al. | |
| 2015/0234751 A1 | 8/2015 | Van Der Sluis et al. | |
| 2015/0317481 A1* | 11/2015 | Gardner | G06F 21/57 |
| | | | 726/2 |
| 2015/0341792 A1 | 11/2015 | Walsh et al. | |
| 2016/0087805 A1 | 3/2016 | Li et al. | |
| 2016/0227348 A1* | 8/2016 | Guo | G06F 21/445 |
| 2017/0149572 A1 | 5/2017 | Wallrabenstein | |
| 2018/0006813 A1* | 1/2018 | Van Der Leest | G09C 1/00 |
| 2018/0183614 A1 | 6/2018 | Danger et al. | |
| 2019/0007222 A1 | 1/2019 | Noguchi | |
| 2019/0132137 A1 | 5/2019 | Zhong et al. | |
| 2019/0165954 A1* | 5/2019 | Lu | H04L 9/0861 |
| 2019/0165958 A1 | 5/2019 | Guajardo Merchan et al. | |
| 2019/0342105 A1 | 11/2019 | Adams et al. | |
| 2019/0349208 A1 | 11/2019 | Merchan et al. | |
| 2023/0096860 A1* | 3/2023 | Cambou | H04L 9/3268 |
| | | | 713/189 |
| 2024/0032442 A1* | 1/2024 | Lee | H10N 52/00 |

FOREIGN PATENT DOCUMENTS

| | | | | |
|---|---|---|---|---|
| KR | 20160044425 A | * | 4/2016 | |
| WO | WO-2017021254 A1 | * | 2/2017 | G09C 1/00 |
| WO | WO-2017046022 A1 | * | 3/2017 | H04L 9/0866 |

OTHER PUBLICATIONS

Yevgeniy Dodis et al., "Fuzzy Extractors: How to Generate Strong Keys from Biometrics and Other Noisy Data," Jan. 20, 2008, SIAM Journal on Computing, 38(1):97-139, 47 pgs.

* cited by examiner

AUTHENTICATION BASED ON PHYSICALLY UNCLONABLE FUNCTIONS

PRIORITY CLAIMS AND CROSS-REFERENCE

This application is a continuation of U.S. patent application Ser. No. 17/360,478 titled "Authentication Based on Physically Unclonable Functions" filed Jun. 28, 2021, which claims priority to U.S. patent application Ser. No. 16/195,417 titled "Authentication Based on Physically Unclonable Functions" filed Nov. 19, 2018, which claims priority to U.S. Provisional Patent Application No. 62/591,982 titled "Method to Increase the Number of Challenge Response Pairs and Secure PUF Helper Data" filed Nov. 29, 2017, the entire disclosures of which are hereby incorporated by reference.

BACKGROUND

Physical unclonable function (PUF) circuits have properties that make it attractive for a variety of security related applications. For example, PUF circuits embodied in integrated circuits (ICs) are used to exploit unique physical characteristics of a system for purpose of authentication. Each instance of the IC will have slightly different physical characteristics due to the random variation in an IC fabrication process. A PUF circuit uses the physical characteristics to generate an identifier value, for example a binary number, which differs from one integrated circuit to the next due to the different physical characteristics of each manufactured device. These identifier values are used to uniquely identify the integrated circuit, as a key for encryption and decryption, or for other purposes.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
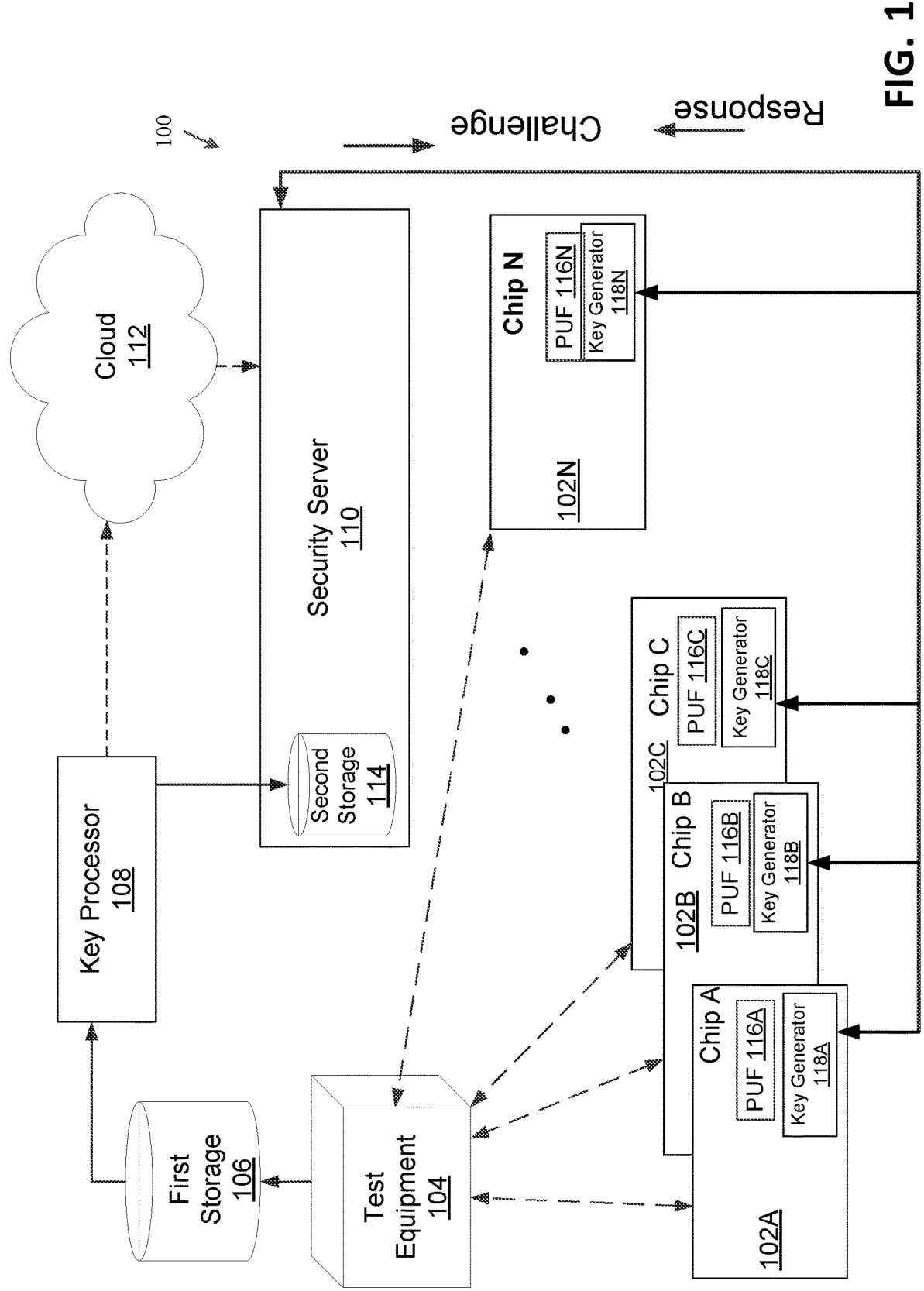
FIG. 1 illustrates an example operating environment in which methods and systems disclosed herein is implemented, in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

A physical unclonable function (PUF) operates according to a challenge-response protocol. An input to the PUF is a challenge, and an output from the PUF is a response. A PUF, thus, can be viewed as a black box that has an input challenge "c", a response "r" output. The relationship between response "r" and challenge "c" is defined by a PUF function $F(x)$. The PUF function $F(x)$ is a unique function such that when the PUF is presented with a challenge "c" it generates a unique response "r".

In example embodiments, the response "r" is used to generate a unique security key that is used for cryptographic security. Helper data is used to compensate for any error introduced in the PUF generated response "r" due to noise, aging and environmental effects. The helper data includes error correcting code (ECC) and/or additional data used to reliably reconstruct the key. The helper data is calculated at commissioning time and passed to the PUF with the challenge "c" data. The PUF uses the helper data to correct any error in the PUF generated response "r" before generating the key as the response to the challenge.

FIG. 1 illustrates an example operating environment 100 in which authentication based on the PUF is performed. Operating environment 100 includes a plurality of chips 102A, 102B, and 102C ... 102N (collectively referred to as chip 102). Chip 102 can be an integrated circuit (IC). Chip 102 can be located on a device. For example, chip 102 can be located on a mobile device, a computing device, a handheld device, etc. In other examples, chip 102 can be located on an authentication device.

As shown in FIG. 1, chip 102 includes a PUF. For example, chip 102A includes PUF 116A, chip 102B includes PUF 116B, chip 102C includes PUF 116C, and chip 102N includes PUF 116N. PUFs 116A, 116B, 116C, and 116N are collectively referred to as PUF 116. PUF 116 is generates a response "r" when a challenge "c" is provided as an input. In example embodiments, PUF 116 can be a ring oscillator (RO) PUF, an arbiter PUF, or a static random access memory (SRAM) PUF.

In example embodiment, each PUF 116 is distinctive and different from all other PUFs on the same chip or other chips. That is, each PUF 116 generates a unique response "r" for a challenge "c" based on its intrinsic properties. In addition, PUF 116 is unclonable. That is, PUF 116 cannot be mimicked or duplicated. Moreover, an exact replica of PUF 116 cannot be made even when exact manufacturing process is used.

In addition, to PUF 116, chip 102 includes a key generator. For example, chip 102A includes key generator 118A, chip 102B includes key generator 118B, chip 102C includes key generator 118C, and chip 102N includes key generator 118N. Key generators 118A, 118B, 118C, and 118N are collectively referred to as key generator 118. In example embodiments, key generator 118 is operable to receive helper data, request for a challenge "c", correct error from the PUF response "r" using the received helper data, and generate a device response for the challenge "c". Functioning of an example of key generator 118 is discussed in detail with respect to FIGS. 4 and 5 of the specification.

Operating environment 100 further includes a test equipment 104. Test equipment 104 is operable to generate a plurality of challenge-response pairs for PUF 116. For example, test equipment inputs a challenge "c" to PUF 116 and receives a response "r'" from PUF 116 for the challenge "c". Test equipment 104 stores the challenge-response pair, and inputs another challenge "c" to create another challenge-response pair. Test equipment 104 repeats the process for a predetermined number of times. The number of times the process is repeated may depend on the technology used to implement PUF 116, an amount of memory available to store the challenge-response pairs, etc. The challenge-response pairs are generated before PUF 116 is integrated into chip 102 or a device.

In example embodiments, test equipment 104 includes a processing device and a memory device which includes instructions which when executed by the processing device causes the processing device to generate the challenge-response pairs. The challenge-pairs are stored in a first storage 106 of operating environment 100. For example, first storage 106 includes a database in which the challenge-response pairs are stored. In example embodiments, first storage 106 is a local storage attached to test equipment 104 or a cloud-based storage accessible to test equipment 104.

Operating environment 100 further includes a key processor 108. Key processor 108 is operative to access the challenge-response pairs from first storage 106, process the challenge-response pairs, generate helper data, and generate an expected device response for each of the plurality of challenges "c" of the challenge-response pairs. In example embodiments, key processor 108 includes a processing device and a memory device which includes instructions which when executed by the processing device causes the processing device to generate the helper data and the expected device response for challenge "c". Functioning of key processor 108 is discussed in detail with respect to FIG. 3 of the specification.

A challenge "c", the helper data, and the expected device response for the challenge "c" is stored on a security server 110. For example, and as shown in FIG. 1, key processor 108 is connected to security server 108. Key processor 108 is connected to security server 110 directly or via cloud 112. Security server 110 includes a second storage 114. The challenge "c", the helper data, and the expected device response for the challenge "c" is stored on second storage 114. For example, second storage 114 includes a database comprising a mapping of the challenge "c", the helper data associated with the challenge "c", and the expected device response for the challenge "c". In example embodiments, second storage 114 is a cloud-based storage.

Figure 2:
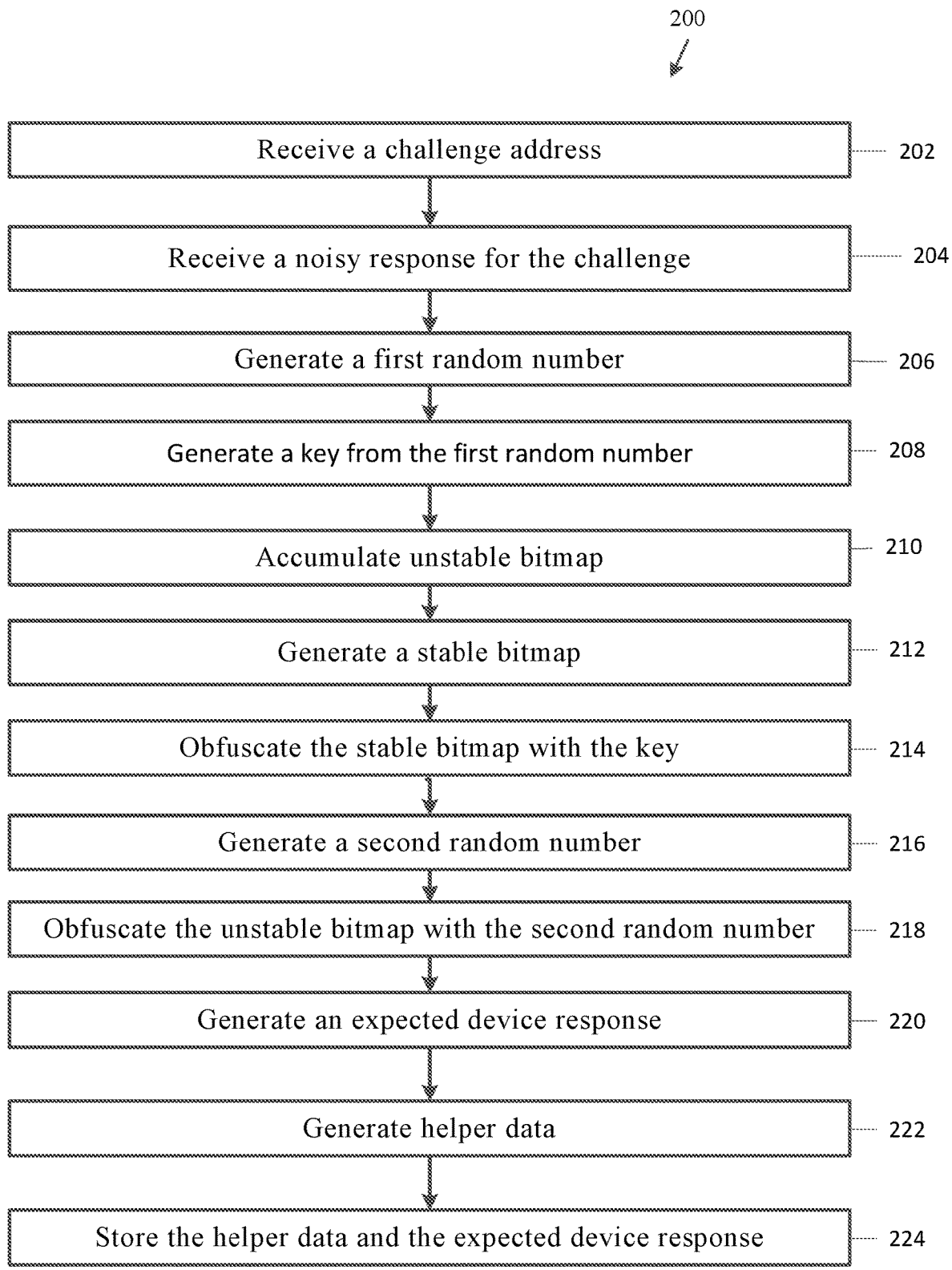
FIG. 2 is a flow diagram of a method for generating helper data and an expected device response for a challenge, in accordance with some embodiments.

FIG. 2 illustrates an example flow diagram illustrating a method 200 for generating the helper data and the expected device response for a challenge "c". Key generator 118 uses the helper data to correct errors in PUF generated response to the challenge "c" to generate a device response R'(Y) for the challenge "c". In example embodiments, a response "r" generated by PUF 116 for a challenge "c" may be different at a later time after commissioning than the one generated as the time of the commissioning. The response "r" of PUF 116 may not exactly match with the response "r" generated at the time of commissioning due to noise, ageing, environmental effects, etc. The response "r" generated at the later time by PUF 116 is also referred to as a noisy response "r". In example embodiments, the helper data is generated to reconstruct the noisy response "r". The helper data includes an error correcting code (ECC) or additional data to reliably reconstruct the noisy response "r". In example embodiments, the helper data is generated at the time of commissioning of PUF 116 and provided a device which incorporates PUF 116 with the challenge "c". In example embodiments, method 200 is executed at key processor 108. In other embodiments, key processor 108 is located on security server 110 and method 200 is executed at security server 110.

At block 202 of method 200, a challenge "c" is received. In example embodiments, a challenge address (A) is received and the challenge "c" is retrieved from the challenge address (A). The challenge "c" is received at key processor 108 from first storage 106. In example embodiments, the challenge "c" is a bitstring of a predetermined length.

At block 204 of method 200, a noisy response "e" corresponding to the challenge "c" is received. For example, the noisy response "e" is received from first storage 106. The noisy response "e" is received by performing a lookup operation in the database containing the challenge-response pairs on first storage 106. The lookup operation is performed by key processor 108. In example embodiments, the noisy response "e" is provided by PUF 116 as an output in response to the challenge "c" as an input, and is stored in database 106. The received noisy response "r" is corrected using the helper data.

For example, at block 206 of method 200, a first random number K(N) is generated. The first random number K(N) is of a predetermined length. For example, the first random number K(N) is a bitstring of 32 to 64 bits. In example embodiments, the first random number K(N) is generated by a first random number generator. The first random number generator can be a physical random number generator or a computational random number generator.

At block 208 of method 200, a first key R(N) is generated. The first key R(N) is generated from the first random number K(N). In example embodiments, the first key R(N) is generated by encoding the first random number K(N). The first random number K(N) is encoded using a first encoding method. In example embodiments, the first random number K(N) is encoded by an error correcting code (ECC) encoder using the first encoding method. The ECC encoder is exemplary in nature and other types of encoders may be used to encode the first random number K(N).

At block 210 of method 200, unstable bitmap M(N) is accumulated. The unstable bitmap M(N) is accumulated from a PUF bitmap W(N). For example, the noisy response "r'" to a challenge "c" is a bitstring of a predetermined length. A PUF bitmap W(N) is the bitmap of the noisy response "r'" and represents positions of bits in the noisy response "r'". The PUF bitmap W(N) can further include a state for each position. To determine the state, bit values of each positions of the PUF bitmap W(N) are compared for the plurality of noisy response "r'". For a position of the PUF bitmap W(N), if the bit value is the same in each of a predetermined number of noisy responses "r'", the position is determined to be in a stable state. The state of such position in the PUF bitmap W(N) is set to a first state, the first state indicating that the bit at the corresponding position in the PUF bitmap W(N) is stable. If the bit value is not constant in the predetermined number of noisy responses "r'", the bit position is determined to be in an unstable state. That is, if the bit value is different in at least two of noisy responses "r'", state of such position in the PUF bitmap W(N) is set to a second state, the second state indicating that the bit at the corresponding bit position in the PUF bitmap W(N) is unstable. The unstable bitmap M(N) is accumulated by accumulating bit positions having the second value.

At block 212 of method 200, stable bitmap Wstable(N) is accumulated. For example, the stable bitmap Wstable(N) is accumulated by accumulating positions having a first value in the PUF bitmap W(N). Alternatively, the stable bitmap Wstable(N) is generated by logical conjunction of the PUF bitmap W(N) and the unstable bitmap M(N). For example, the unstable bitmap M(N) is inverted using an inverter or a NOT logic gate, and the inverted unstable bitmap M(N) is logically conducted (AND operation) with PUF bitmap W(N) to produce the stable bitmap Wstable(N).

At block 214 of method 200, the stable bitmap Wstable(N) is obfuscated. The stable bitmap Wstable(N) is obfuscated using the key R(N). For example, the stable bitmap Wstable(N) is obfuscated by determining an exclusive disjunction (also referred to as XOR logical operation) of the stable bitmap Wstable(N) and the key R(N) to produce a stable string S(N). The stable bitmap Wstable(N) and the key R(N) are provided to the two inputs of a XOR gate and the stable string S(N) is received at the output of the XOR gate.

At block 216 of method 200, a second random number X(N) is generated. The second random number X(N) is of a predetermined length. For example, the second random number X(N) is a bitstring of 32 to 64 bits. The second random number X(N) is generated by a second random number generator. The second random number generator can be a physical random number generator or a computational random number generator. In example embodiments, the second random number is distinct from the first random number generator.

At block 218 of method 200, the unstable bitmap M(N) is obfuscated. The unstable bitmap M(N) is obfuscated using the second random number X(N). For example, the unstable bitmap M(N) is obfuscated by determining an exclusive disjunction (also referred to as XOR operation) of the unstable bitmap M(N) and the second random number X(N) to produce a unstable string U(N). The unstable bitmap M(N) and the second random number X(N) are provided to the two inputs of a XOR gate and the unstable string U(N) is received at the output of the XOR gate.

At block 220 of method 200, an expected device response R(Y) is generated. The expected device response R(Y) is generated by generating a hash of the second random number X(N), the stable bitmap Wstable(N), and the key R(N). The hash is generated by using a hashing function, such as a cryptographic hashing function. For example, the cryptographic hashing function maps the second random number X(N), the stable bitmap Wstable(N), and the key R(N) to generate the expected device response R(Y) of a fixed size. The hashing function is operable to be one-way function and is used to authenticate the data while keeping the data private. Different hashing functions, such as SHA-1, SHA-3, and MD-5, are used depending on the security level required. For example, a SHA-1 hashing function can generate a response of 128 bit length while SHA-3 is able to generate 512 bits hash value.

At block 222 of method 200, helper data is generated. The helper data is generated for each challenge "c". In example embodiments, the helper data includes the second random number X(N), a challenge address (A), the unstable string U(N), and the stable string S(N). In other example embodiments, the helper data includes the second random number X(N), the challenge "c", the unstable string U(N), and the stable string S(N). In yet other example embodiments, the helper data includes only the challenge "c" and the unstable string U(N), and the second random number and the stable string S(N) are generated locally. At step 224 of method 200, the generated helper data is stored along with the challenge "c" and the expected device response R(Y) for the challenge "c". For example, the helper data, the challenge "c", and the expected device response R(Y) for the challenge "c" are stored in at second storage 114 of security server 110.

Figure 3:
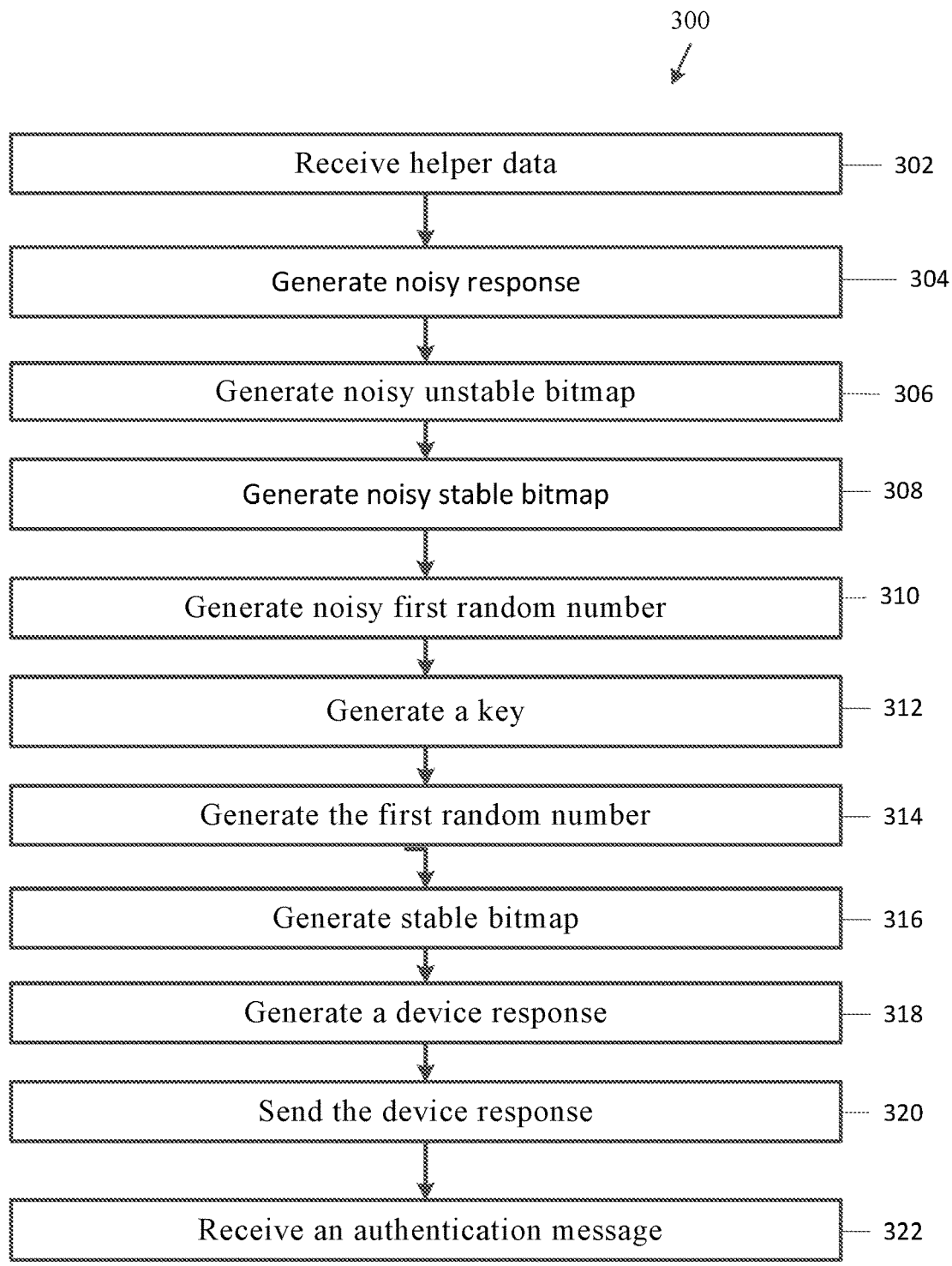
FIG. 3 illustrates a flow diagram of a method for generating a device response, in accordance with some embodiments.

FIG. 3 illustrates a flow diagram of a method 300 for generating a device response. Method 300 is executed or performed at key generator 118 of chip 102. For example, method 300 is executed in response to receiving a helper data from security server 110 at a device in lieu of an authentication request from the device. The device may send the authentication request when the device wants access to a network secured by security server 110.

At block 302 of method 300, helper data is received. The helper data is received from security server 110. For example, security server 110 sends the helper data to the devices in response to the authentication request received from the device. The helper data includes the second random number X(N), the challenge address (A) of the challenge "c", the unstable string U(N), and the stable string S(N). In example embodiments, the helper data does not include the second random number X(N), the unstable string U(N), and the stable string S(N). In such embodiments, the second random number X(N), the unstable string U(N), and the stable string S(N) are generated locally at the requesting device. In such embodiments, a size of the helper data is significantly less than the size of the helper data containing the second random number X(N), the unstable string U(N), and the stable string S(N).

At block 304 of method 33, a noisy response is generated. For example, a challenge "c" is retrieved from the challenge address (A). The challenge "c" is provided as an input to PUF 116. PUF 116 generates a response to the challenge "c". The response generated by PUF 116 to the challenge "c" is referred to as noisy response "r'". In example embodiments, a bitmap of the noisy response "r'", also referred to as a noisy bitmap w'(N), is generated. The noisy bitmap w'(N) represents positions of bits in the noisy response "r'".

At block 306 of method 300, an unstable bitmap is generated. The unstable bitmap M(N) is generated from the second random number X(N) and the unstable string U(N). For example, the unstable bitmap M(N) is generated by determining an exclusive disjunction (also referred to as XOR operation) of the unstable string U(N) and the second random number X(N). The unstable string U(N) and the second random number X(N) are inputted to two inputs of a XOR gate and the unstable bitmap M(N) is received at the output of the XOR gate.

At block 308 of method 300, a noisy stable bitmap w'stable(N) is generated. The noisy stable bitmap w'stable(N) is generated for the noisy response "r'" from the unstable bitmap M(N) and the noisy bitmap w'(N). For example, the unstable bitmap M(N) is inverted using an inverter (a NOT logic gate), and the inverted unstable bitmap M(N) is logically conjuncted (AND operation) with noisy bitmap w'(N) to produce noisy stable bitmap w'stable(N).

At block 310 of method 300, a noisy first random number R'(N) is generated. The noisy first random number R'(N) is generated from the stable string S(N) and the noisy stable bitmap w'stable(N). For example, the noisy first random number R'(N) is generated by determining an exclusive disjunction (XOR operation) of the noisy stable bitmap w'stable(N) and the stable string S(N). The noisy stable bitmap w'stable(N) and the stable string S(N) are inputted to two inputs of a XOR gate and the noisy first random number R'(N) is received at the output of the XOR gate.

At block 312 of method 300, a key K(P) is generated. The key K(P) is generated by decoding the noisy first random number R'(N). In example embodiments, the noisy first random number R'(N) is decoded by a error correcting code (ECC) decoder. The ECC decoder includes a corresponding decoding function of the encoding function of the ECC encoder of key processor 108 used to encode the first random number R(N).

At block 314 of method 300, a first random number R(N) is generated. The first random number R(N) is generated by encoding the key K(P). In example embodiments, the key K(P) is encoded using the ECC encoder. That is, the key K(P) is encoded using the same encoding function which is used to encode the first random number R(N) by key processor 108.

At block 316 of method 300, a stable bitmap Wstable(N) is generated. The stable bitmap Wstable(N) is generated from the stable string S(N) and the first random number R(N). For example, the stable bitmap Wstable(N) is generated by determining an exclusive disjunction (XOR operation) of the stable string S(N) and the first random number R(N). The stable string S(N) and the first random number R(N) are inputted to two inputs of a XOR gate and the stable bitmap Wstable(N) is received at the output of the XOR gate.

At block 318 of method 300, a device response R'(Y) is generated. The device response R'(Y) is generated by determining a hash of the second random number X(N), the stable bitmap Wstable(N), and the first random number R(N). The hash of the second random number X(N), the stable bitmap Wstable(N), and the first random number R(N) is generated by using the same hashing function used by key processor 108 to generate the expected device response R(Y). The hashing function is operable to be one-way function and is being used to authenticate the data while keeping the data private. Different hashing functions (i.e., SHA-1, SHA-3, and MD-5) are used depending on the security level required. For example, a SHA-1 hashing function can generate a response of 128 bit length while SHA-3 will be able to generate 512 bits hash value.

At block 320 of method 300, the device response R'(Y) is sent to security server 110. In example embodiments, the device response R'(Y) is sent to security server 110 as a response to the helper data received from security server 110. The device response R'(Y) is sent to security server 110 over a secured communication channel.

At block 322 of method 300, an authentication message is received. The authentication message is received from security server 110 in response to the device response R'(Y) is sent to security server 110. For example, security server 110 process the device response R'(Y) to determine whether to grant access to the device or not. Security server 110, based on the processing the device response R'(Y), generates and sends the authentication message to the device.

Figure 4:
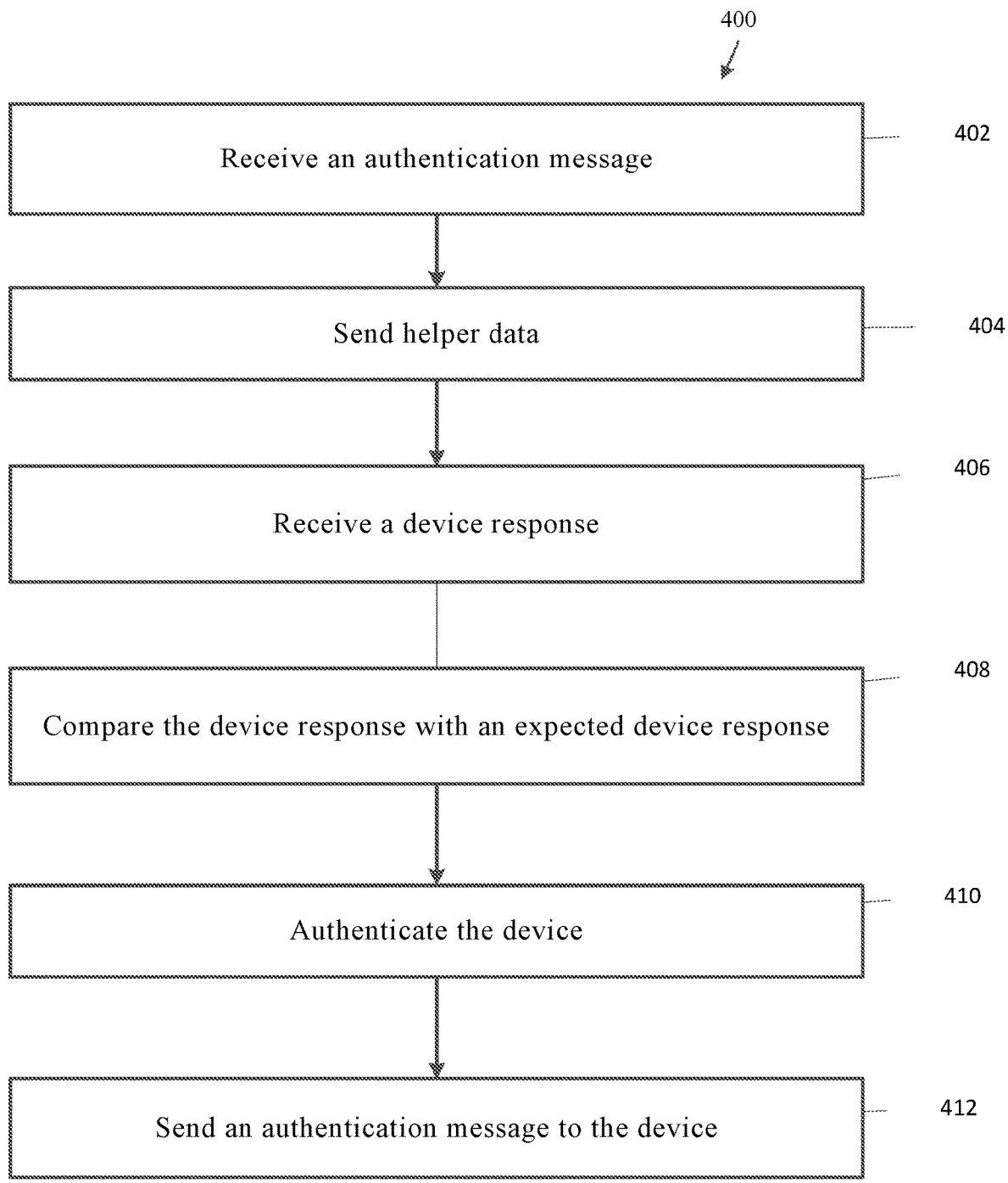
FIG. 4 illustrates a flow diagram of a method for authenticating a device, in accordance with some embodiments.

FIG. 4 illustrates a flow diagram of a method 400 for authenticating a device. Method 400 is executed at security server 110 in response to receiving an authentication request from a device. At block 402 of method 400, an authentication request is received. The authentication message is received at security server 110 from a device trying to establish communication with a secured system. That is, the authentication request is received when the device wants access to a network secured by security server 110.

At block 404 of method 400, helper data is sent. For example, security server 110 sends the helper data to the device in response to receiving the authentication request. The helper data includes a second random number X(N), a challenge address (A), a unstable string U(N), and a stable string S(N). In example embodiments, the helper data only includes a challenge address (A). In such embodiments, a size of the helper data is significantly reduced.

At block 406 of method 400, a device response R'(Y) is received in response to the helper data. The device requesting the authentication generates the device response string the helper data. For example, key generator 118 uses the challenge address to generate a PUF response from PUF 116, and generate the device response R'(Y) from the PUF response. The device then sends the device response R'(Y) as a response to the helper data to security server 110.

At block 408 of method 400, the received device response R'(Y) is compared with an expected device response R(Y). For example, security server retrieves the expected device response R(Y) for the challenge address (A) from second storage 114 and compares the expected device response R(Y) with the received device response R'(Y).

At block 410 of method 400, the device is authenticated based on the comparison. For example, if the received device response R'(Y) matches with the expected device response R(Y), the device is granted access to the secured system. On the contrary, if the received device response R'(Y) does not match with the expected device response R(Y), the device is denied access to the secured system.

At step 412 of method 400, an authentication message is sent to the device. The authentication message includes the outcome of the comparison. That is, the authentication message includes whether the device is granted access to the secured system or not. In example embodiments, when access is device to the device, the device is allowed a predetermined number of re-attempts to gain access. After failing to secure access in the predetermined number of re-attempts, the device may be marked as suspicious and timed out. That is, the device may not be allowed to send another authentication request for a predetermined amount of time.

Figure 5:
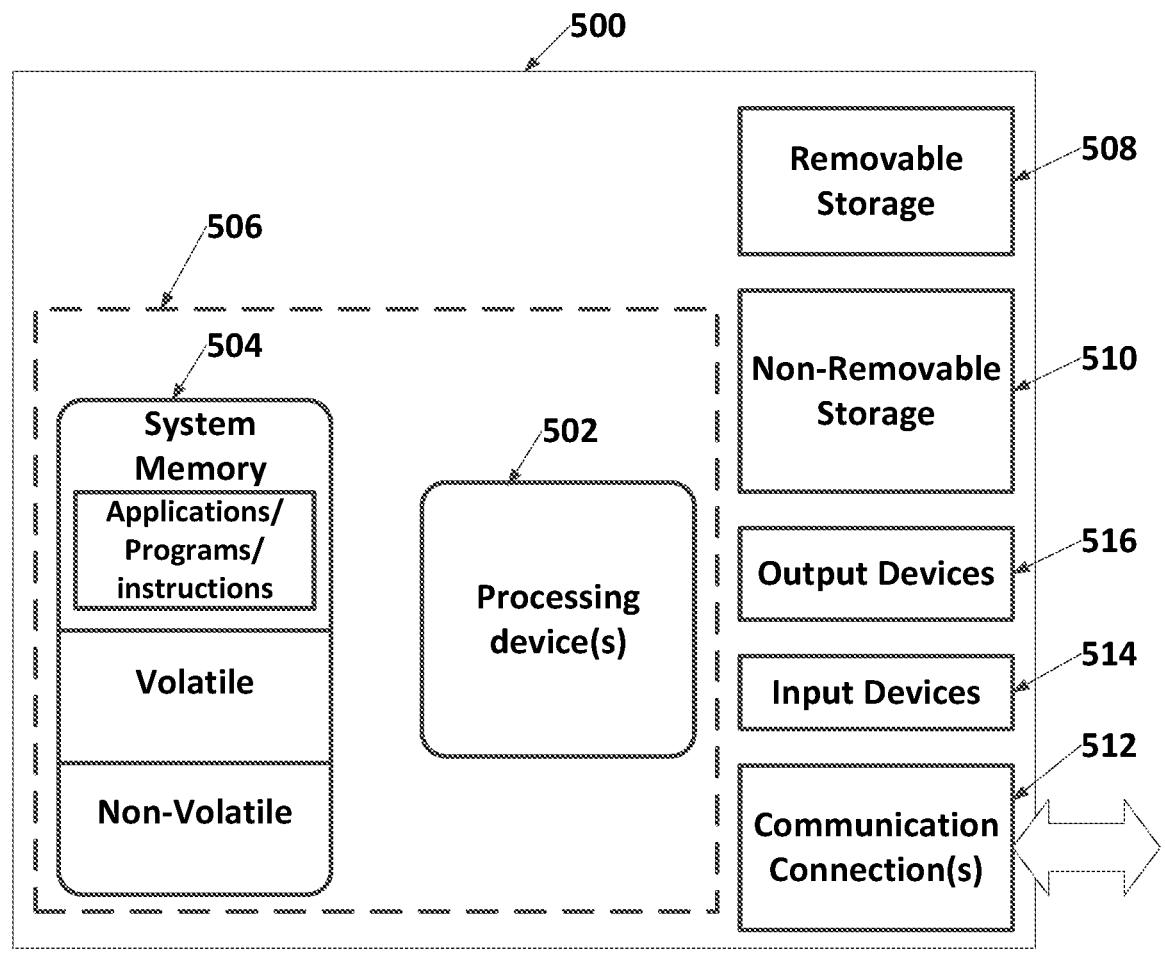
FIG. 5 illustrates one example of a suitable computing device in which one or more of the present examples may be implemented.

FIG. 5 and the additional discussion in the present specification are intended to provide a brief general description of a suitable computing environment in which the present disclosure and/or portions thereof may be implemented. Although not required, the embodiments described herein may be implemented as computer-executable instructions, such as by program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

FIG. 5 illustrates one example of a suitable computing device 500. This is only one example and is not intended to suggest any limitation as to the scope of use or functionality. Other well-known computing systems, environments, and/or configurations that may be suitable for use include, but are not limited to, personal computers, server computers, handheld or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, computing device 500 typically includes at least one processing device 502 and a memory 504. Depending on the exact configuration and type of computing device 500, memory 504 (storing, among other things, APIs, programs, etc. and/or other components or instructions to implement or perform the system and methods disclosed herein, etc.) may be volatile (such as RAM), non-volatile (such as ROM, flash memory, etc.), or some combination of the two. This most basic configuration is illustrated in FIG. 5 by dashed line 506. Further, computing device 500 includes storage devices (removable, 508, and/or non-removable, 510) including, but not limited to, magnetic or optical disks or tape. Similarly, computing device 500 also have input device(s) 514 such as a keyboard, mouse, pen, voice input, etc. and/or output device(s) 516 such as a display, speakers, printer, etc. Also included in computing device 500 may be one or more communication connections, 512, such as LAN, WAN, point to point, etc.

Computing device 500 includes at least some form of computer readable media. The computer readable media may be any available media that can be accessed by processing device 502 or other devices comprising the operating environment 100. For example, the computer readable media may include computer storage media and communication media. The computer storage media may include volatile and nonvolatile, removable and non-removable media implemented in any method or technology for storage of information such as computer readable instructions, data structures, program modules or other data. The computer storage media may include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. The computer storage media may not include communication media.

The communication media may embody computer readable instructions, data structures, program modules, or other data in a modulated data signal such as a carrier wave or other transport mechanism and includes any information delivery media. The term "modulated data signal" may mean a signal that has one or more of its characteristics set or changed in such a manner as to encode information in the signal. For example, the communication media may include a wired media such as a wired network or direct-wired connection, and wireless media such as acoustic, RF, infrared and other wireless media. Combinations of any of the above should also be included within the scope of computer readable media.

Computing device 500 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

The different aspects described herein may be employed using software, hardware, or a combination of software and hardware to implement and perform the systems and methods disclosed herein. Although specific devices have been recited throughout the disclosure as performing specific functions, one skilled in the art will appreciate that these devices are provided for illustrative purposes, and other devices may be employed to perform the functionality disclosed herein without departing from the scope of the disclosure.

As stated above, a number of program modules and data files may be stored in system memory 504. While executing on processing device 502, program modules 508 (e.g., applications, Input/Output (I/O) management, and other utilities) may perform processes including, but not limited to, one or more of the stages of the operational methods described herein such as methods 200, 300, and 400 illustrated in FIGS. 2, 3, and 4 respectively, for example.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the operating environment 500 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

In example embodiments, the methods and systems disclosed above secures the helper data due to obfuscation. Moreover, the disclosed methods and systems have ability to correct a number of errors due to noise and environment interferences. In addition, using the disclosed methods and systems, a large number of security keys can be generated. For example, SHA-3 512 hashing function, the disclosed methods and systems can generate $2^{**}12$ challenge-response pairs for a 128 bit PUF. In addition, device response length can be increased to address larger security key requirements.

A method for authenticating a device is provided. The method includes receiving a noisy first response from a physically unclonable function for a first challenge; generating an error code for correcting the noisy first response; generating an expected first response from the noisy first response and the error code; storing the expected first response and corresponding first helper data, the first helper data comprising the first challenge and the error code; and providing the first helper data to a first device in response to an authentication request from the first device, the first device comprising the physically unclonable function.

A device includes a physically uncontrollable function operative to generate a noisy first response corresponding to a first challenge; and a key generator. The key generator is operative to: generate a device response from the noisy first response and an error code, the key generator being operative to generate the device response by correcting the noisy first response with the error code; send the device response to a first server for authentication of the device; and receive an authentication response from the first server, wherein the first server is operative to authenticate the device by comparing the device response with an expected response for the helper data.

A system for authenticating a device, the system comprises a processor and a memory operatively connected to the processor storing computer executable instructions that, when executed by the processor, cause the processor to execute a method that comprises: receiving a noisy response from a physically unclonable function for a challenge; generating an error code for correcting the noisy response, the error code comprising obfuscated stable bitmap; generating an expected device response from the noisy response and the error code; storing the expected device response and helper data corresponding to the first challenge, the helper data comprising the challenge and the error code; providing the helper data to a device in response to an authentication request from the device, the device comprising the physically unclonable function; receiving a device response from the first device; comparing the device response with the expected device response; and authenticating the device based on the comparison.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of authenticating a device, the method comprising:
   sending, by a device, an authentication request to a server;
   receiving, by the device in response to sending the authentication request, helper data from the server, the helper data comprising a challenge for a physically unclonable function located on the device and an obfuscated stable bitmap of a noisy response corresponding to the challenge;
   generating the noisy first response from the physically unclonable function using the first challenge;
   generating a device response from the noisy first response and the obfuscated stable bitmap;
   sending the device response to the server; and
   receiving an authentication response from the server.

2. The method of claim 1, wherein generating the device response from the noisy first response and the obfuscated stable bitmap comprises:
   generating a noisy stable response from the noisy first response and an unstable bitmap of the noisy first response;
   generating a key from the obfuscated stable bitmap and the noisy stable response;
   generating a stable bitmap from the key and the obfuscated stable bitmap; and
   hashing the stable bitmap and the key.

3. The method of claim 2, further comprising:
   generating the unstable bitmap of the noisy first response.

4. The method of claim 2, wherein generating the key comprises:
   generating a noisy first random number from the obfuscated stable bitmap of the noisy first response and the noisy stable response;
   decoding the noisy first random number to generate a first random number; and
   encoding the first random number to generate the key.

5. The method of claim 1, further comprising:
   generating a plurality of challenge response pairs for the physically unclonable function;
   generating an error code comprising the obfuscated stable bitmap for each of the plurality of challenge response pairs; and
   providing the challenge response pairs and the error code for each of the challenge response pairs to the server.

6. The method of claim 5, wherein generating the error code comprising the obfuscated stable bitmap comprises:
   generating a stable bitmap of a noisy response corresponding to each challenge; and
   obfuscating the stable bitmap.

7. The method of claim 6, wherein obfuscating the stable bitmap comprises obfuscating the stable bitmap with one of the following: a first random number and an encoded first random number.

8. The method of claim 5, wherein the error code further comprises an obfuscated unstable bitmap, wherein generating the error code comprising the obfuscated unstable bitmap comprises:
   generating a unstable bitmap of a noisy response corresponding to each challenge; and
   obfuscating the unstable bitmap.

9. The method of claim 8, wherein obfuscating the unstable bitmap comprises obfuscating the unstable bitmap with a second random number.

10. A device comprising:
    a Physically Unclonable Function (PUF) operative to generate a noisy first response to a first challenge; and
    a key generator comprising a processor and a memory coupled to the processor, the memory comprising instructions which when executed by the processor causes the key generator to be operative to:
    generate a device response from the noisy first response and an obfuscated stable bitmap of the noisy first response;
    sending the device response to a server; and
    receiving an authentication response from the server.

11. The device of claim 10, wherein the key generator being operative to generate the device response from the noisy first response and the obfuscated stable bitmap comprises the key generator being operative to:
    generate a noisy stable response from the noisy first response and an unstable bitmap of the noisy first response;
    generate a key from the obfuscated stable bitmap and the noisy stable response;

generate a stable bitmap from the key and the obfuscated stable bitmap; and hash the stable bitmap and the key.

12. The device of claim 11, wherein the key generator is further operative to:

generate the unstable bitmap of the noisy first response.

13. The device of claim 11, wherein the key generator being operative to generate the key comprises the key generator being operative to:

generate a noisy first random number from the obfuscated stable bitmap of the noisy first response and the noisy stable response;

decode the noisy first random number to generate a first random number; and encode the first random number to generate the key.

14. The device of claim 10, wherein the key generator is further operative to:

generate a plurality of challenge response pairs for the PUF;

generate an error code comprising the obfuscated stable bitmap for each of the plurality of challenge response pairs; and provide the challenge response pairs and the error code for each of the challenge response pairs to the server.

15. The device of claim 10, wherein a relationship between the noisy first response and the first challenge is defined by a PUF function F (x), and wherein the PUF function F (x) is a unique function such that when the PUF is presented with the first challenge it generates a unique noisy first response.

16. The device of claim 10, wherein the PUF 116 comprises one of the following: a ring oscillator (RO) PUF, an arbiter PUF, and a static random access memory (SRAM) PUF.

17. A system for authenticating a device, the system comprising:

a processor; and a memory operatively connected to the processor, the memory storing computer executable instructions that, when executed by the processor, cause the processor to execute a method that comprises:

sending an authentication request to a server;

receiving, in response to sending the authentication request, helper data from the server, the helper data comprising a challenge for a physically unclonable function located on the device and an error code;

generating the noisy response from the physically unclonable function using the first challenge;

generating a device response from the noisy first response and the error code;

sending the device response to the server; and receiving an authentication response from the server.

18. The system of claim 17, wherein the error conde comprises an obfuscated stable bitmap of the noisy first response, and wherein generating the device response from the noisy first response and the error code comprises:

generating a noisy stable response from the noisy first response and an unstable bitmap of the noisy first response;

generating a key from the obfuscated stable bitmap and the noisy stable response;

generating a stable bitmap from the key and the obfuscated stable bitmap; and hashing the stable bitmap and the key.

19. The system of claim 18, wherein generating the key comprises:

generating a noisy first random number from the obfuscated stable bitmap of the noisy first response and the noisy stable response;

decoding the noisy first random number to generate a first random number; and encoding the first random number to generate the key.

20. The system of claim 18, wherein the method further comprises:

generating a plurality of challenge response pairs for the physically unclonable function;

generating an error code comprising the obfuscated stable bitmap for each of the plurality of challenge response pairs; and providing the challenge response pairs and the error code for each of the challenge response pairs to the server.

* * * * *